United States Patent
Kim et al.

(10) Patent No.: US 11,442,674 B2
(45) Date of Patent: Sep. 13, 2022

(54) CHANGING OPERATIONAL STATE OF IMAGE FORMING APPARATUS BASED ON DISTANCE OF SENSED BODY

(71) Applicant: HEWLETT-PACKARD DEVELOPMENT COMPANY, L.P., Spring, TX (US)

(72) Inventors: Su Hwan Kim, Pangyo (KR); Hwi Kyeong An, Pangyo (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/401,815

(22) Filed: Aug. 13, 2021

(65) Prior Publication Data

US 2021/0397388 A1    Dec. 23, 2021

Related U.S. Application Data

(63) Continuation of application No. 16/629,100, filed as application No. PCT/KR2018/002404 on Feb. 27, 2018, now Pat. No. 11,119,709.

(30) Foreign Application Priority Data

Jul. 19, 2017  (KR) .......................... 10-2017-0091496

(51) Int. Cl.
 *G06F 3/12* (2006.01)
(52) U.S. Cl.
 CPC .......... *G06F 3/1221* (2013.01); *G06F 3/1229* (2013.01); *G06F 3/1238* (2013.01)

(58) Field of Classification Search
 CPC ..... G06F 3/1221; G06F 3/1229; G06F 3/1238
 USPC ......................................... 358/1.14
 See application file for complete search history.

(56) References Cited

U.S. PATENT DOCUMENTS

| | | | |
|---|---|---|---|
| 5,822,077 A | 10/1998 | Sasaki | |
| 7,280,249 B2* | 10/2007 | Ohta | ........................ G07D 7/12 358/1.14 |
| 2008/0007767 A1* | 1/2008 | Ishimaru | ............ H04N 1/32117 358/1.15 |
| 2012/0328319 A1 | 12/2012 | Ogata | |
| 2013/0120779 A1* | 5/2013 | Baba | ........................ G06F 1/325 358/1.13 |
| 2014/0064774 A1 | 3/2014 | Masumoto et al. | |
| 2015/0002877 A1 | 1/2015 | Yasuhiro et al. | |
| 2015/0227328 A1 | 8/2015 | Yokoyama | |
| 2015/0237227 A1 | 8/2015 | Saisho | |
| 2015/0331352 A1 | 11/2015 | Motoyama | |
| 2016/0371040 A1* | 12/2016 | Idehara | ................. G06F 3/1212 |
| 2017/0134600 A1 | 5/2017 | Imamura | |
| 2017/0160686 A1* | 6/2017 | Tanaka | ............... H04N 1/00037 |
| 2018/0004463 A1* | 1/2018 | Masumoto | ............ G06F 3/1222 |
| 2018/0026524 A1 | 1/2018 | Kasamatsu et al. | |

(Continued)

FOREIGN PATENT DOCUMENTS

| | | |
|---|---|---|
| JP | 201693981 | 5/2016 |
| JP | 2017121753 | 7/2017 |

*Primary Examiner* — Allen H Nguyen
(74) *Attorney, Agent, or Firm* — Staas & Halsey LLP

(57) ABSTRACT

An image forming apparatus includes a sensor to output a signal, and a processor. The processor is to change an operation state of the image forming apparatus based on the signal indicative of an amount of change in the signal maintained for a time period.

20 Claims, 16 Drawing Sheets

(56) References Cited

U.S. PATENT DOCUMENTS

2018/0101210 A1    4/2018   Fukui
2018/0321732 A1   11/2018   Fukushi
2020/0174721 A1    6/2020   Shibata

* cited by examiner

【Figure 1】
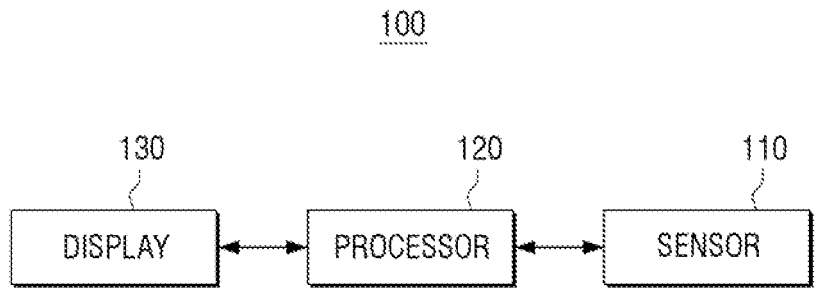
【Figure 2】
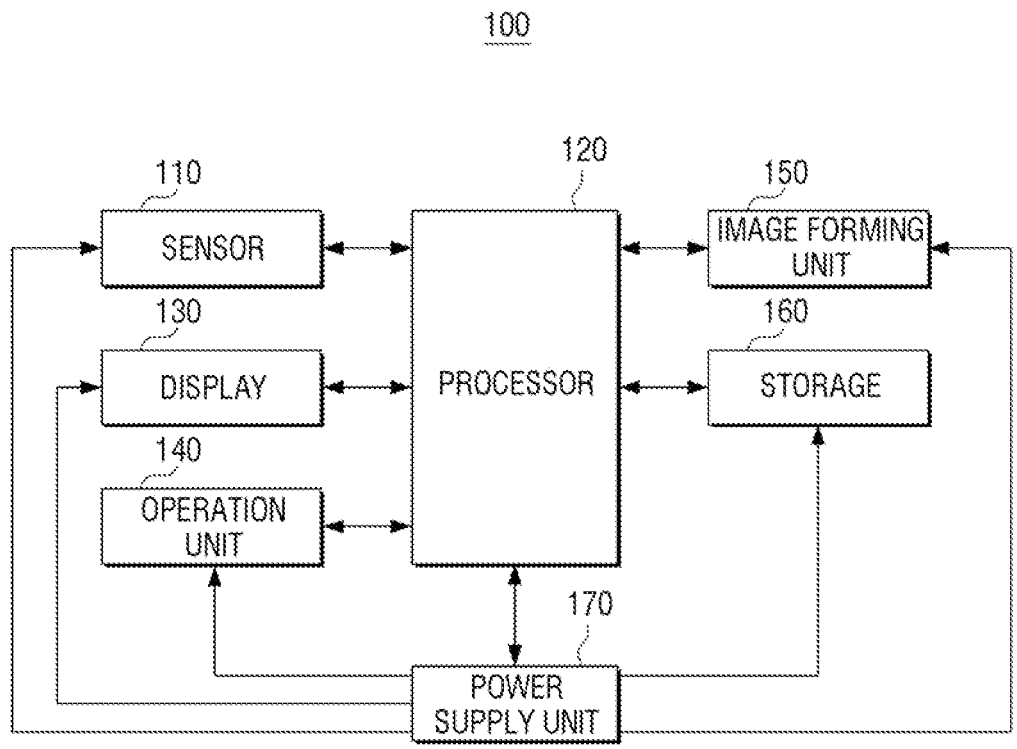

【Figure 3】
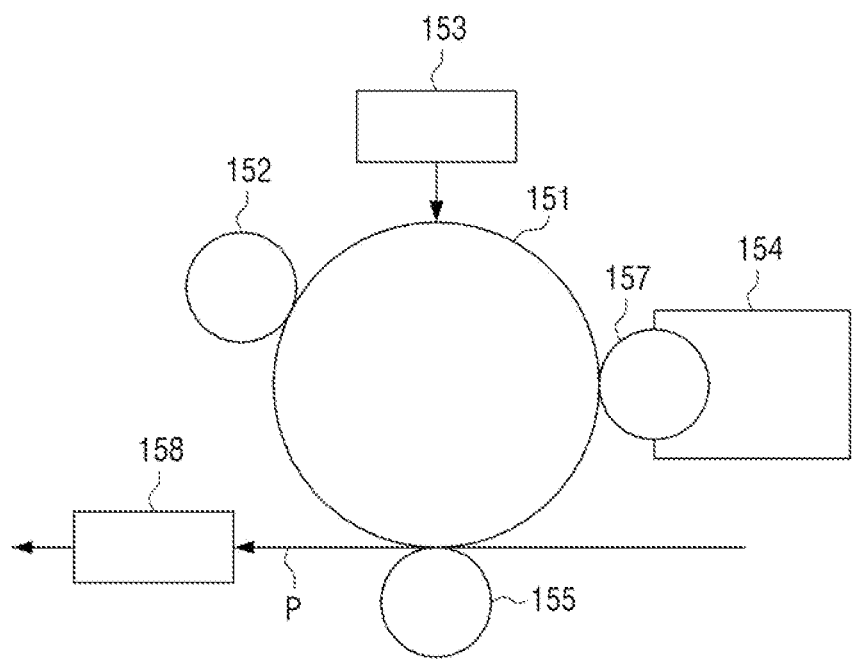

【Figure 4】
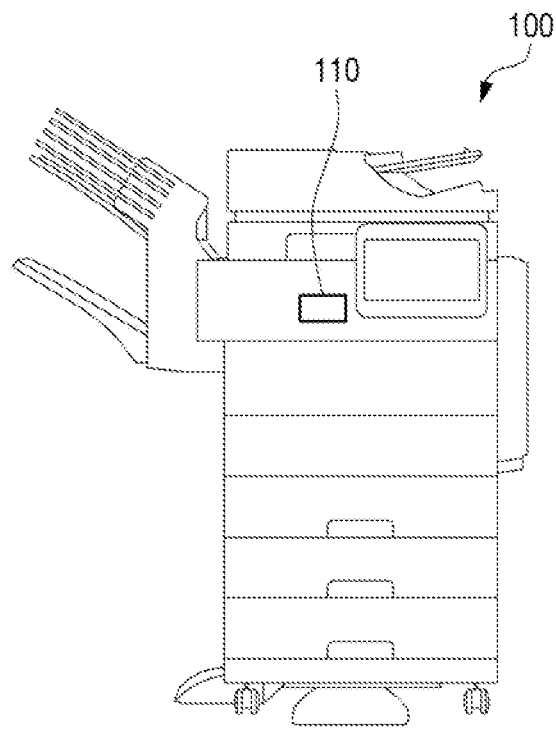
【Figure 5】
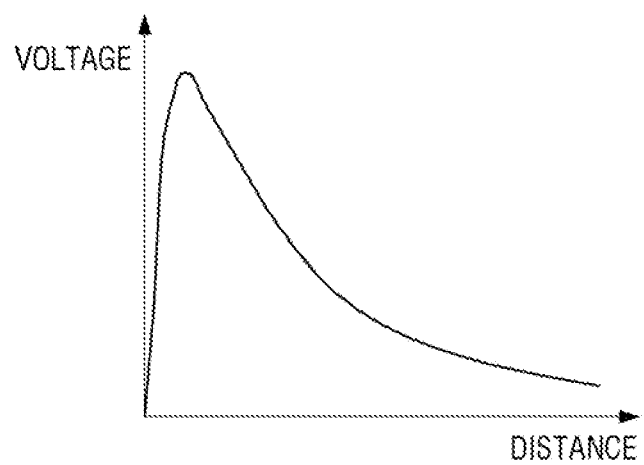

[Figure 6]
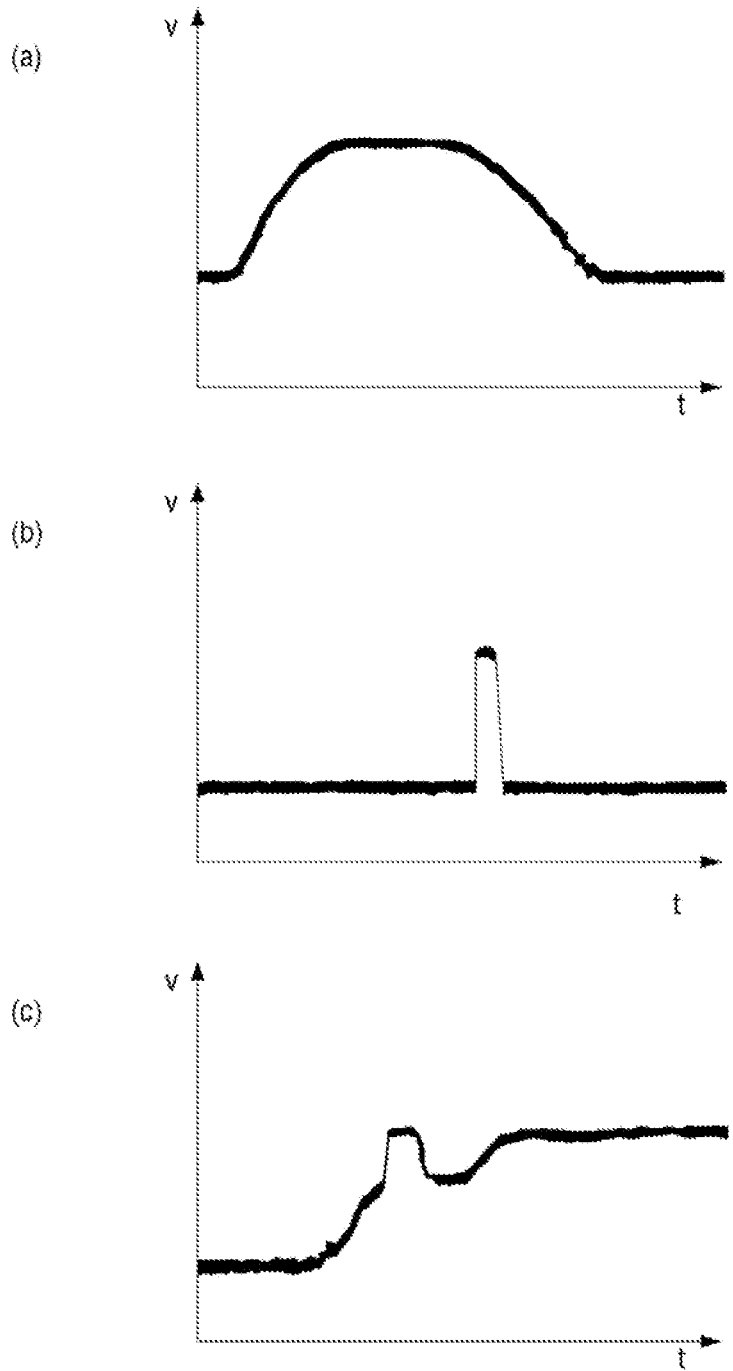

[Figure 7]
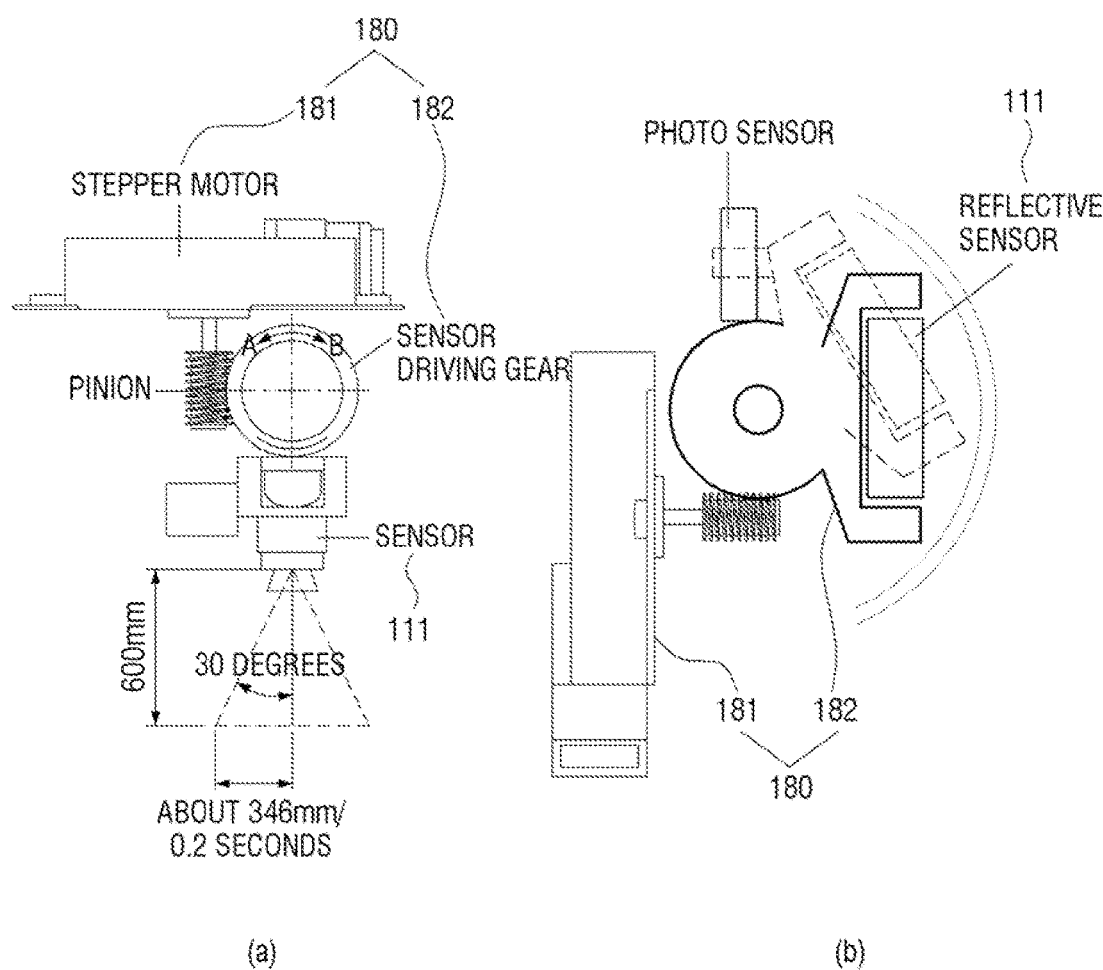

【Figure 8】
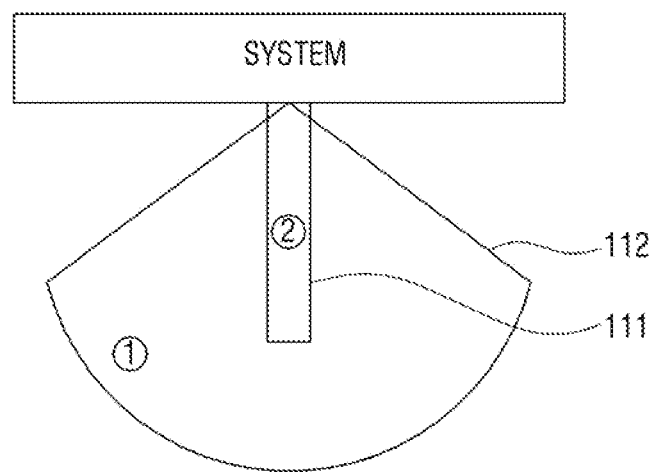
【Figure 9】
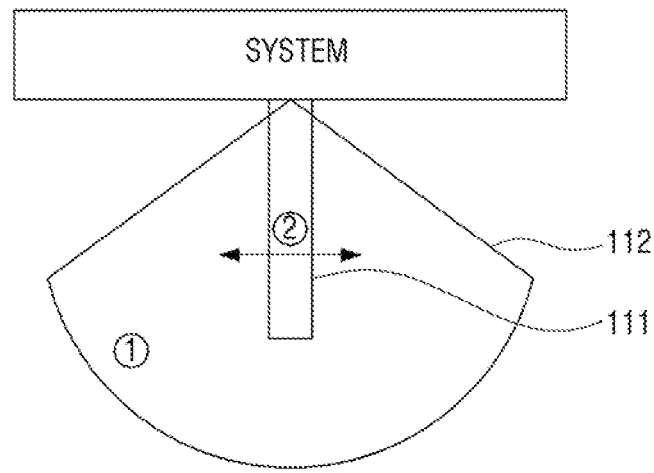

[Figure 10]
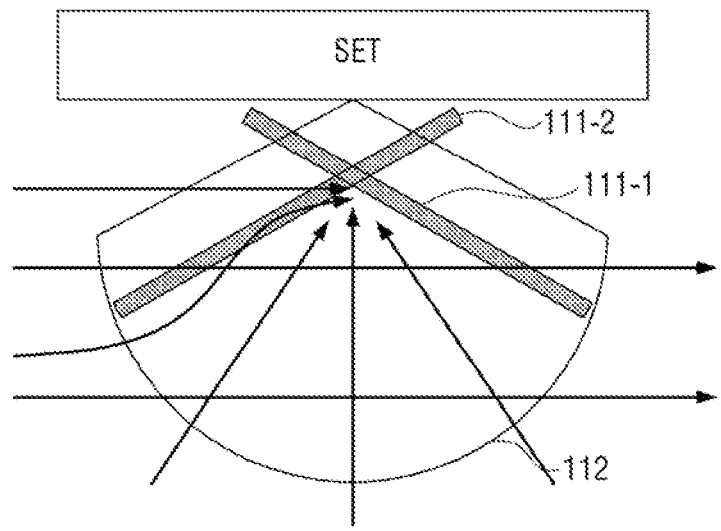
[Figure 11]
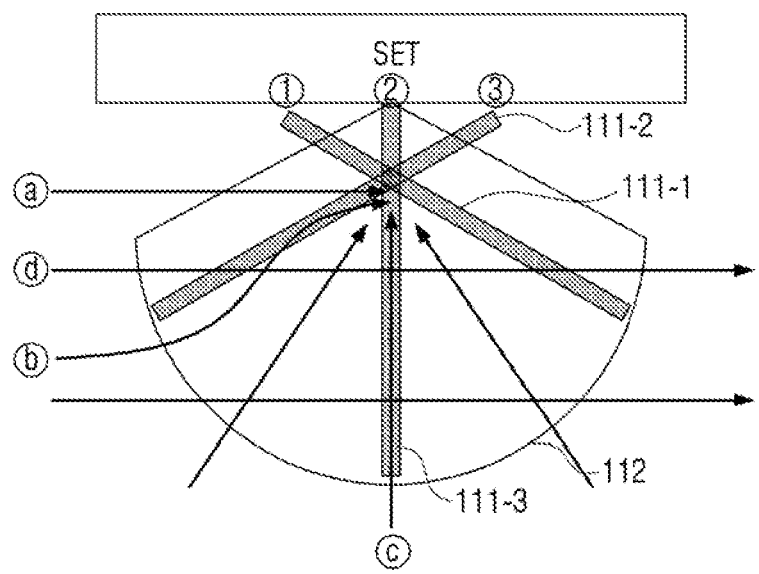

【Figure 12】
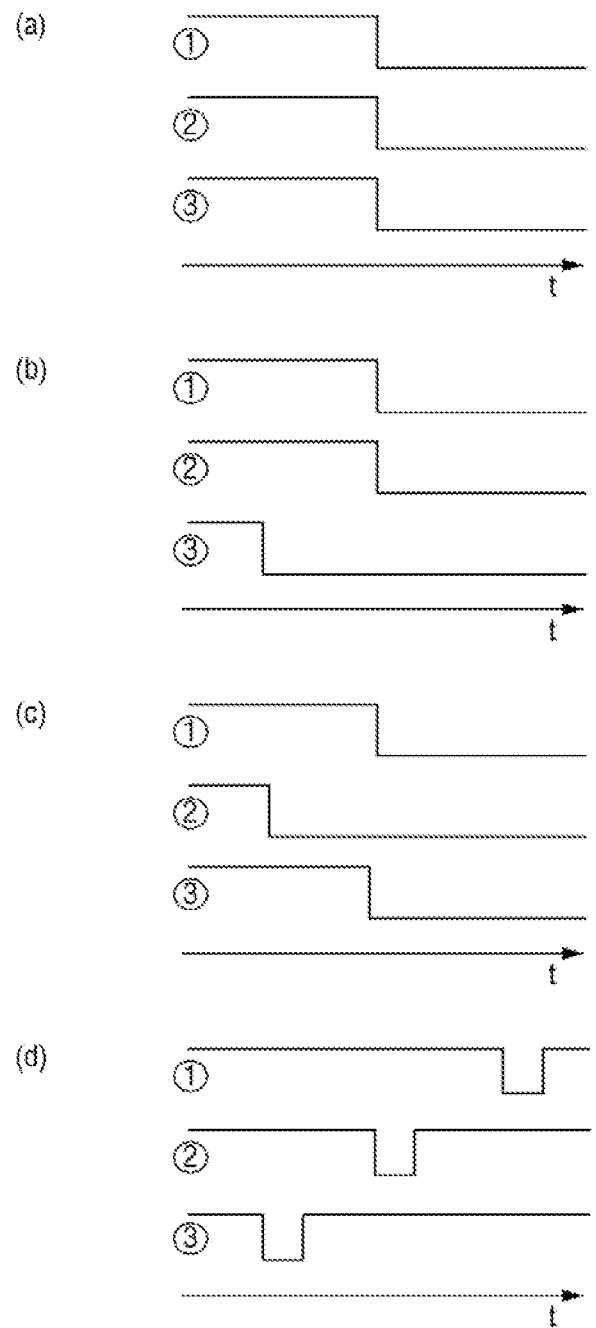

[Figure 13]
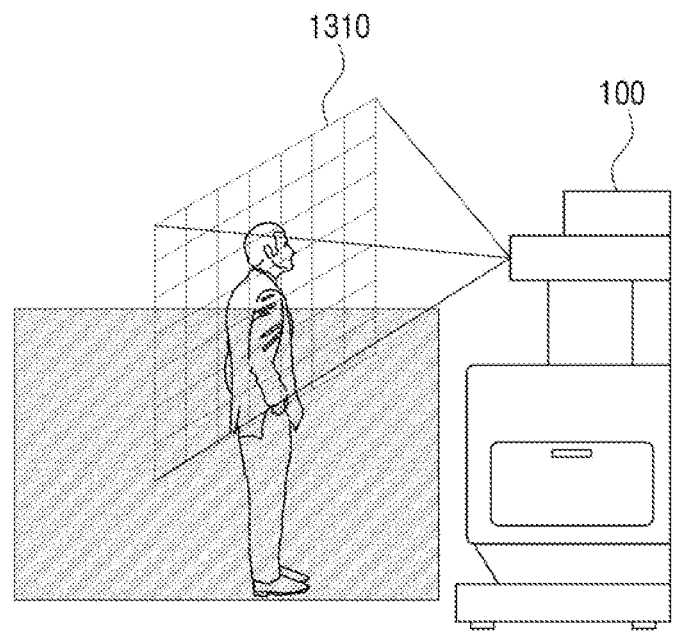
(a)
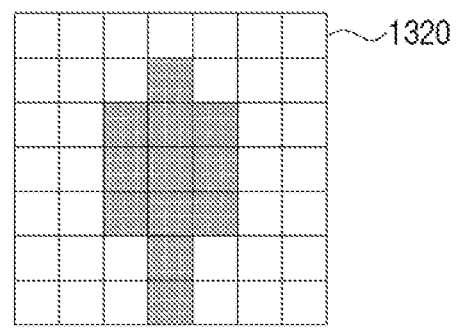
(b)

[Figure 14]
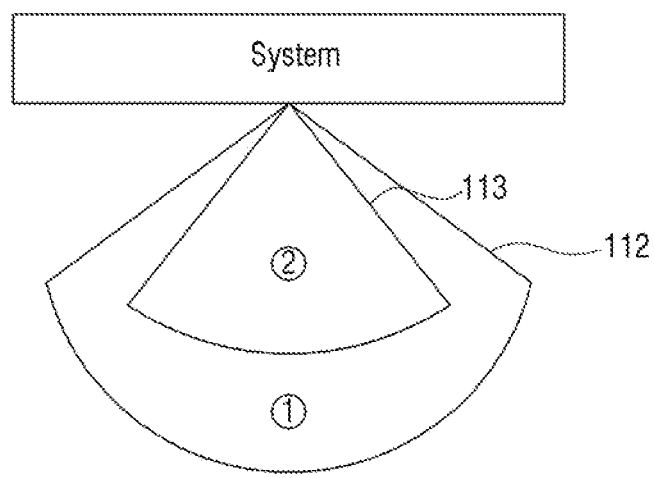

[Figure 15]
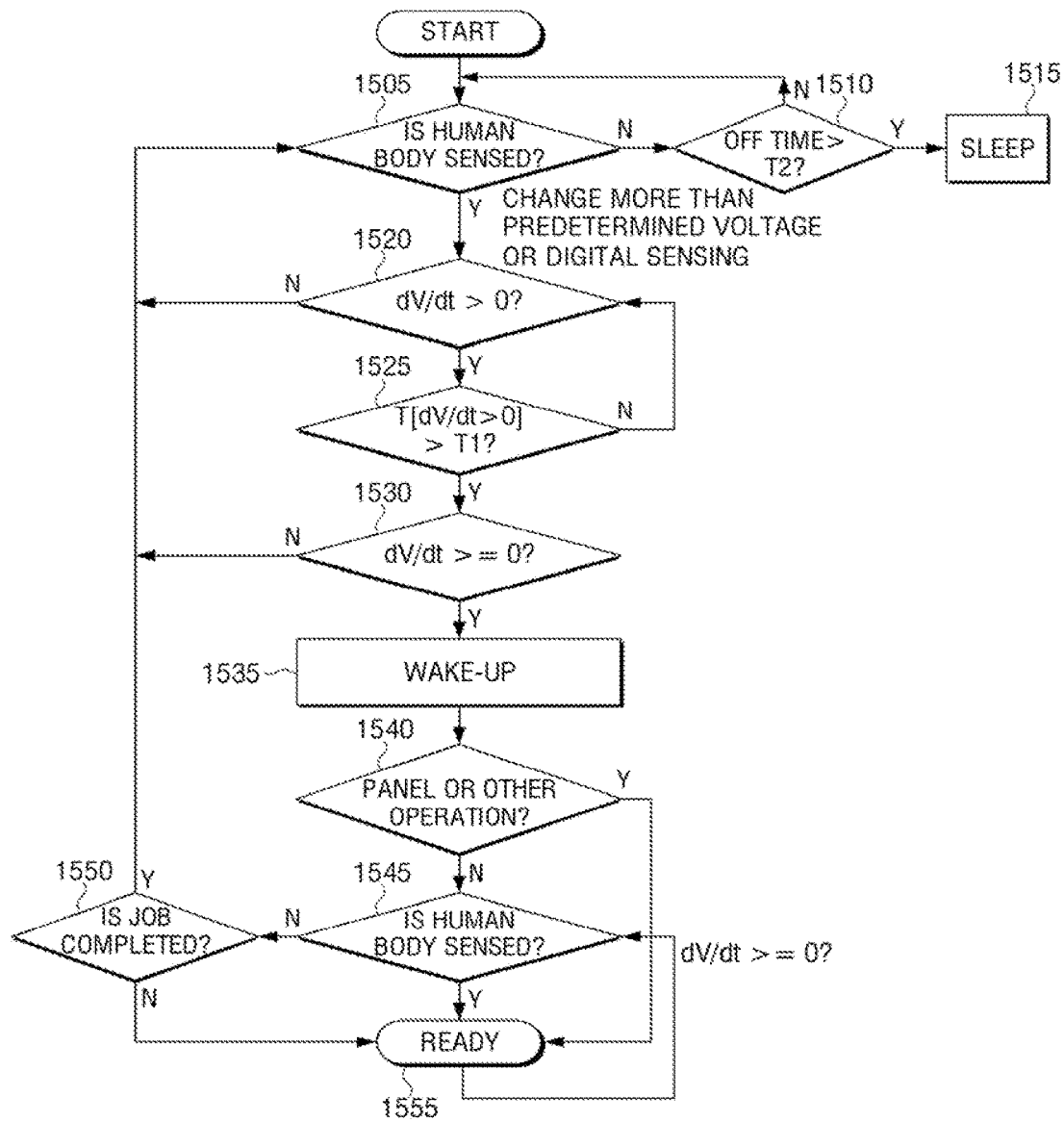

【Figure 16】
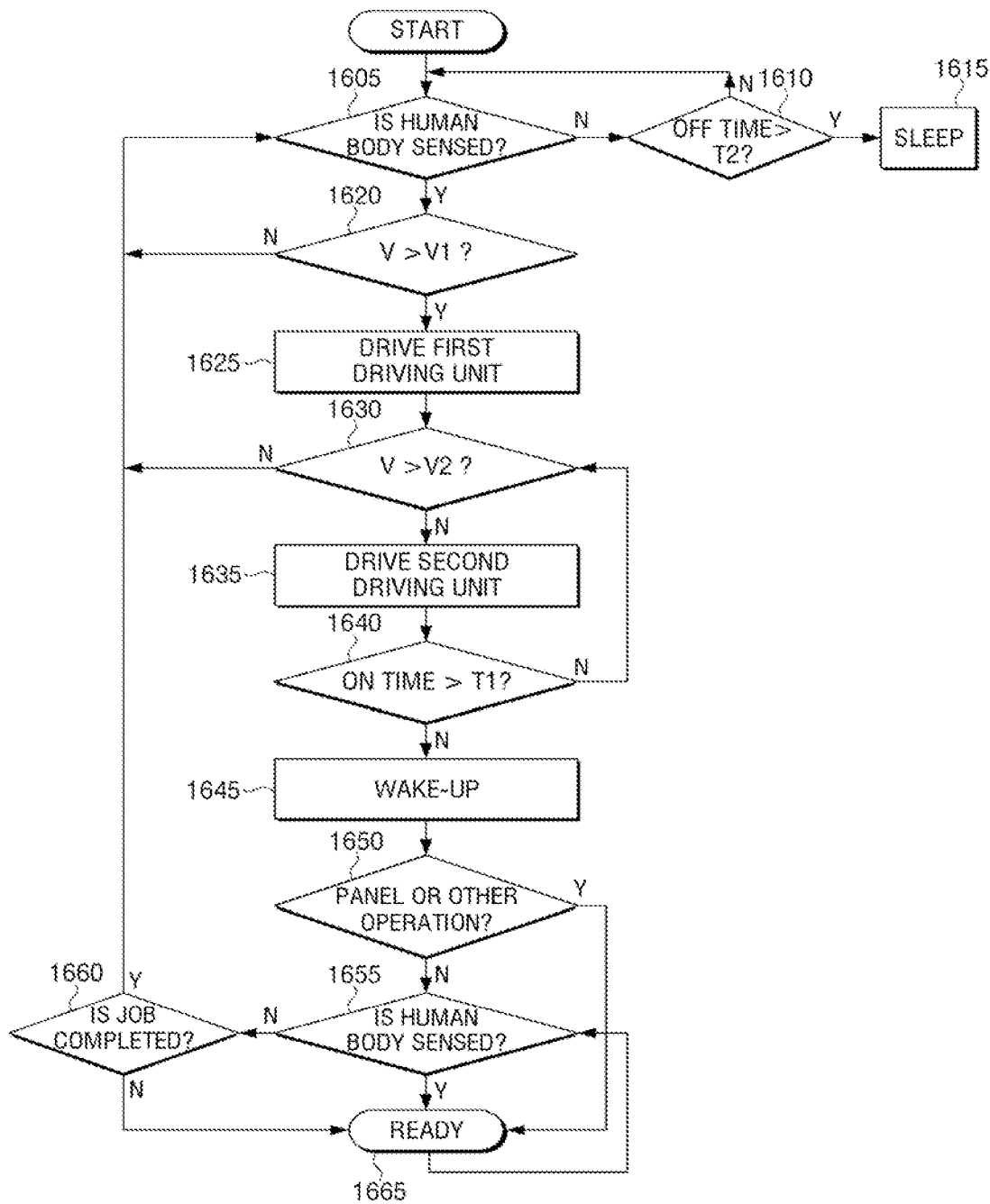

【Figure 17】
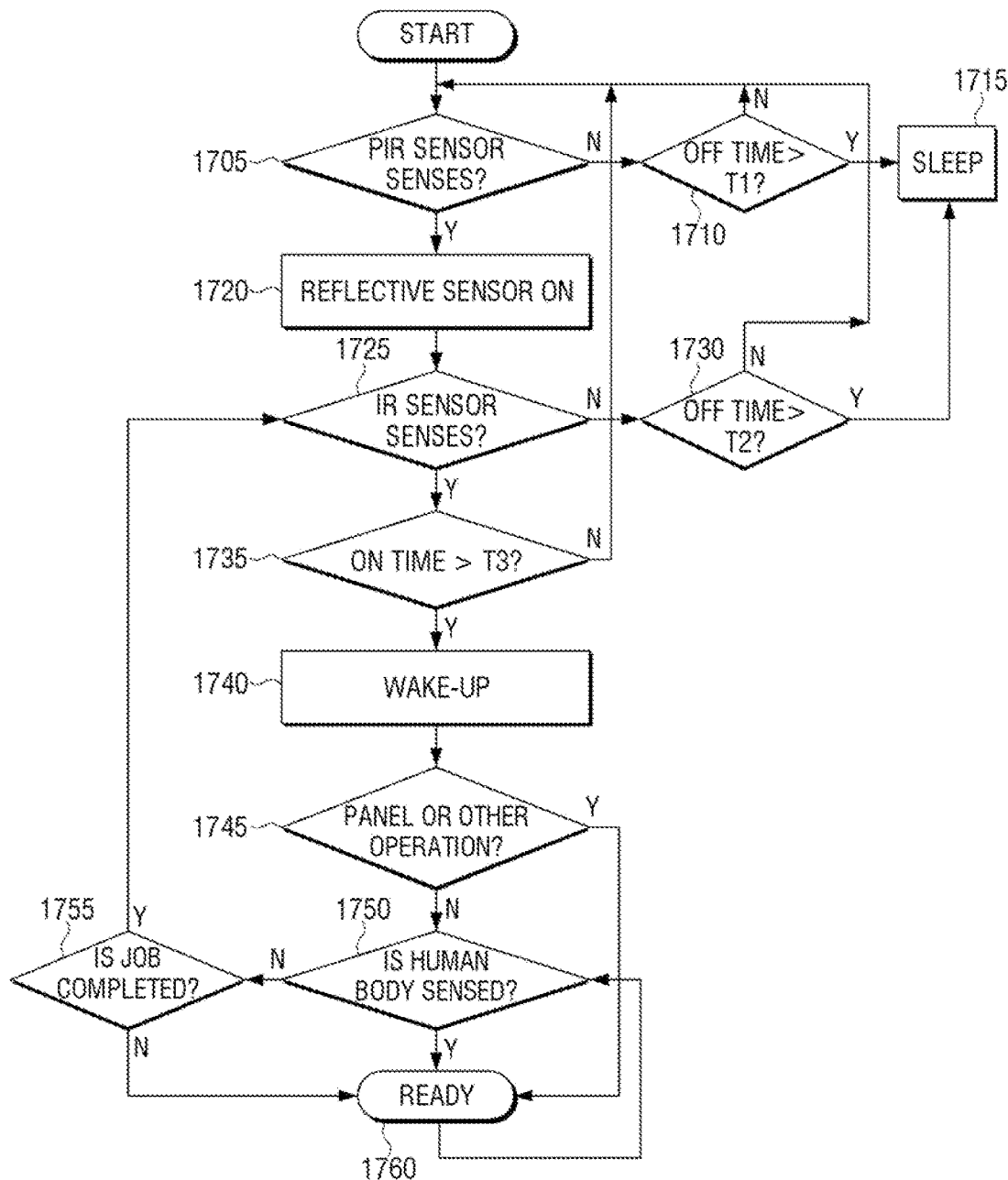

【Figure 18】
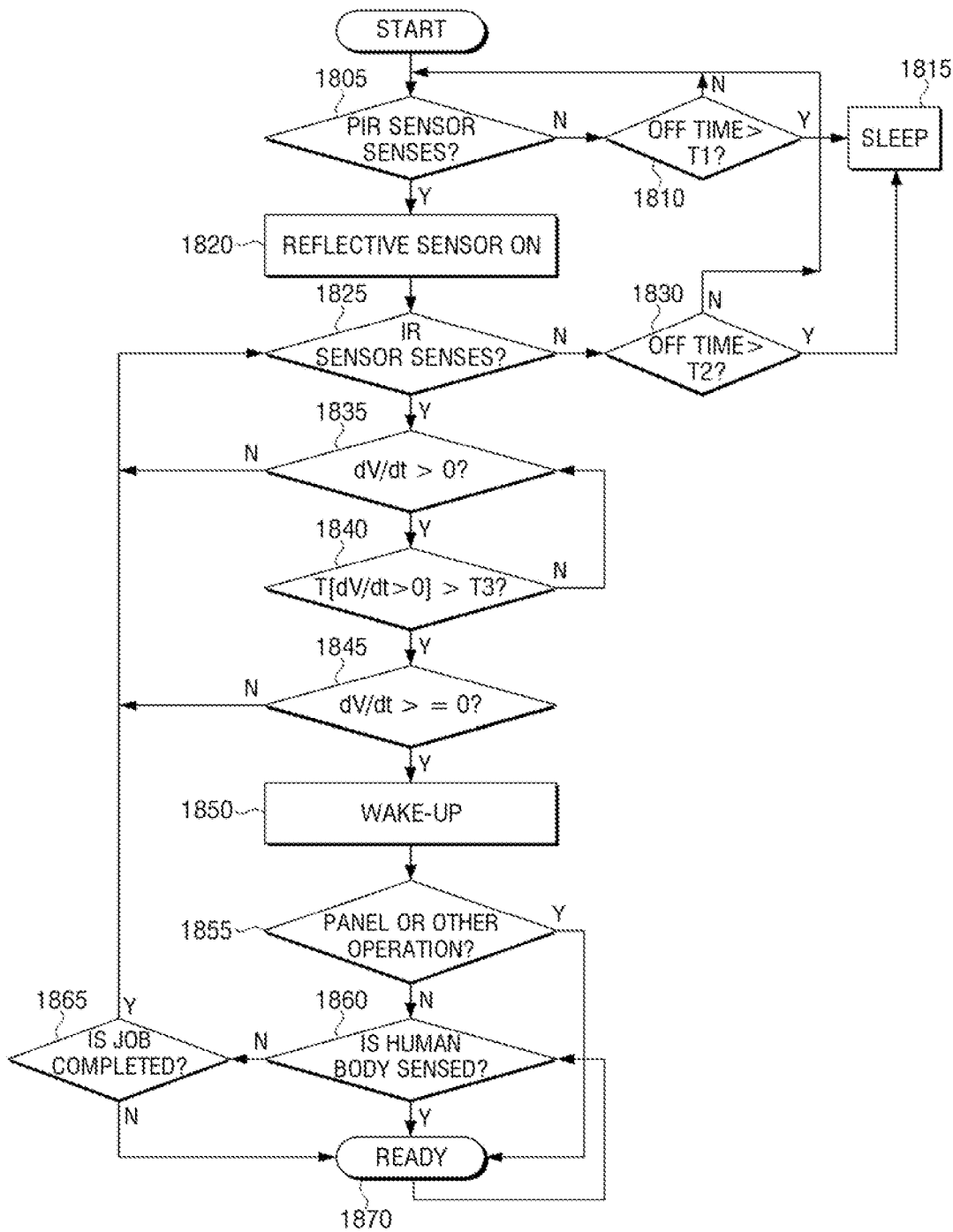

[Figure 19]
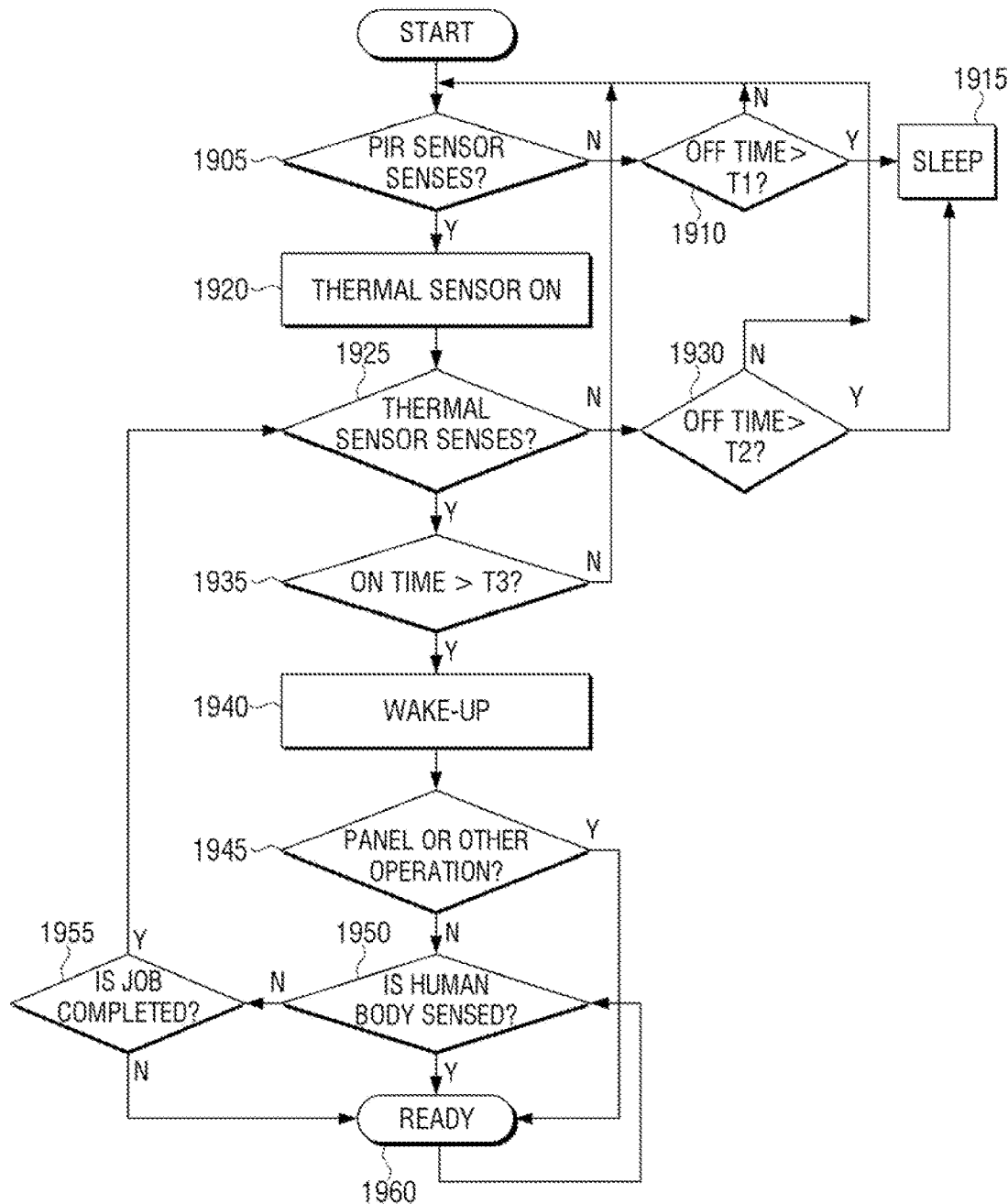

【Figure 20】
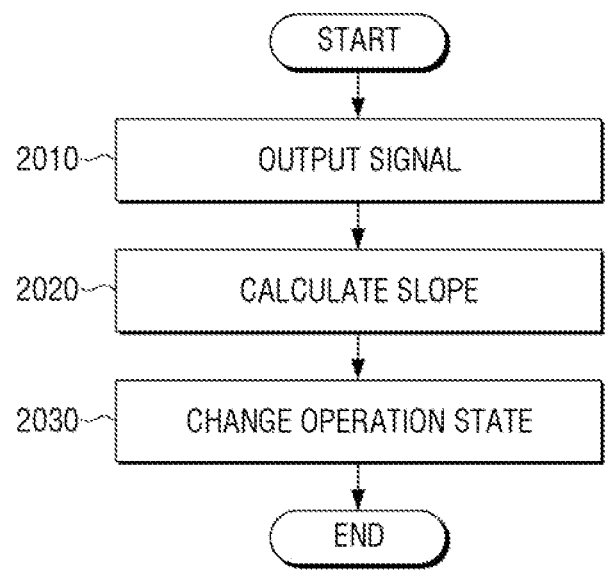

CHANGING OPERATIONAL STATE OF IMAGE FORMING APPARATUS BASED ON DISTANCE OF SENSED BODY

CROSS-REFERENCE TO RELATED APPLICATIONS

This application is a continuation application of U.S. patent application Ser. No. 16/629,100, filed on Jan. 7, 2020, which is a 371 National Stage Application of International Patent Application No. PCT/KR2018/002404, filed on Feb. 27, 2018, which claims priority from Korean Patent Application No. 10-2017-0091496, filed on Jul. 19, 2017, in the Korean Intellectual Property Office. The disclosures of each of all of the above-identified applications are incorporated herein by reference in their entirety.

BACKGROUND

An image forming apparatus can be an apparatus that performs generating, printing, receiving, and transmitting of image data. Typical examples of the image forming apparatus include a printer, a scanner, a copier, a fax machine, and a multifunction peripheral device.

Recently, an image forming apparatus supports a power saving state (or a power saving mode) in order to reduce power consumption. Such a power saving state is a state in which power is not supplied to a specific configuration in the image forming apparatus and thus the image forming apparatus has a low power consumption.

DESCRIPTION OF DRAWINGS

The above and/or other aspects will be more apparent by describing certain exemplary embodiments, with reference to the accompanying drawings, in which:

FIG. 1 is a block diagram which illustrates a simple configuration of an image forming apparatus according to an exemplary embodiment, FIG. 2 is a block diagram which illustrates a detailed configuration of an image forming apparatus according to an exemplary embodiment, FIG. 3 is a configuration map according to an exemplary embodiment of the image forming unit of FIG. 2, FIG. 4 illustrates a disposition location of a sensor according to an exemplary embodiment, FIG. 5 illustrates an operation characteristic of an infrared reflective sensor, FIG. 6 illustrates an example of an output waveform of an infrared reflective sensor, FIG. 7 illustrates a configuration of a sensor of which a sensing direction can be changed, FIGS. 8 to 11 illustrate various examples of using a plurality of sensors, FIG. 12 illustrates an example of a signal waveform according to an example of FIG. 11, FIGS. 13 and 14 illustrate an example of using a thermal sensor, FIG. 15 is a flowchart to describe an operation method according to a first exemplary embodiment, FIG. 16 is a flowchart to describe an operation method according to a second exemplary embodiment, FIG. 17 is a flowchart to describe an operation method according to a third exemplary embodiment, FIG. 18 is a flowchart to describe an operation method according to a fourth exemplary embodiment, FIG. 19 is a flowchart to describe an operation method according to a fifth exemplary embodiment, and FIG. 20 is a flowchart to describe a controlling method of an image forming apparatus according to an exemplary embodiment.

DETAILED DESCRIPTION

Reference will now be made in detail to example embodiments which are illustrated in the accompanying drawings, wherein like reference numerals refer to like elements throughout. Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments may be practiced without those specifically defined matters. Also, well-known functions or constructions are not described in detail since they would obscure the description with unnecessary detail.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

The term "image forming job" as used herein may mean various jobs related to the image (e.g., printing, scanning or faxing), such as forming an image or generating/storing/transmitting, and "job" may mean not only an image forming operation but also a series of processes which are necessary for performing an image forming operation.

The term "image forming apparatus" may refer to a device that prints print data generated by a terminal device such as a computer on recording paper. Examples of such an image forming apparatus include a copying machine, a printer, a facsimile, or a multi-function printer (MFP) that combines the functions of the copier, the printer, and the facsimile through a single device. The term may refer to any device capable of performing image forming operations, such as a printer, a scanner, a fax machine, a multi-function printer (MFP), or a display apparatus.

The term "hard copy" may refer to an operation of outputting an image to a print medium such as paper, and "soft copy" may refer to an operation of outputting an image to a display device such as a TV or a monitor.

Further, the term "content" may refer to all kinds of data to be subjected to an image forming operation such as a photograph, an image, or a document file.

The term "print data" may refer to data converted into a printable format in the printer. On the other hand, if the printer supports direct printing, the file itself may be print data.

Also, the term "user" may refer to a person who performs an operation related to an image forming operation using an image forming apparatus or a device connected with an image forming apparatus by wire or wirelessly. Also, "administrator" may refer to a person who has authority to access all the functions and systems of the image forming apparatus. The "administrator" and "user" may be the same person.

The conventional image forming apparatus has not been able to know when a user intends to proceed or end the operation. Accordingly, the conventional image forming apparatus is switched from the power saving state to the normal state (or the standby state) according to the touch or operation of the user, and after waiting for a predetermined period of time after the end of the operation, the operation to switch to the power saving state was performed. However, since the conventional image forming apparatus maintains a normal state for a predetermined period of time, unnecessary power is consumed for a predetermined period of time. Further, an image forming apparatus takes a long time to change from the power saving state to the normal state in order to increase the temperature of the fixing device, etc. However, there is also a problem that waiting time occurs when the power is switched from the power saving state to the normal state after the users operation.

FIG. 1 is a block diagram which illustrates a simple configuration of an image forming apparatus according to an exemplary embodiment.

Referring to FIG. 1, an image forming apparatus 100 includes a sensor 110, a processor 120, and a display 130.

The sensor 110 senses a user within a predetermined range. Specifically, the sensor 110 may be disposed on the front surface of the image forming apparatus 100 to sense the user. The sensor 110 may be an infrared reflective sensor, an ultrasonic sensor, a thermal sensor, or the like. Here, the predetermined range is a spatial range according to the inherent sensing distance at which the sensor may sense the user and the arrangement position of the sensor.

The infrared reflective sensor is a sensor that detects infrared rays and outputs a voltage value corresponding to the size of the sensed infrared rays. Such an infrared reflective sensor outputs a voltage value inversely proportional to the distance as shown in FIG. 5.

The ultrasonic sensor is a sensor that emits ultrasonic pulses in a predetermined direction and measures the distance from the object by measuring the time until the reflected wave reflected from the object is received. Such an ultrasonic sensor may output a voltage value corresponding to or inversely proportional to the distance to an object, or output the distance value itself.

The thermal image sensor is a sensor that detects far-infrared rays emitted from the human body. Such a sensor may have a two-dimensional matrix structure as shown in FIG. 13, or may have a single-row array structure.

Hereinafter, in order to facilitate the description, it is assumed that the sensor is formed of an infrared reflective sensor. However, the ultrasonic sensor and the thermal sensor may be used as the sensor 110 at the time of implementation, and the following descriptions may be applied according to the characteristics of the sensor. In addition, it is also possible to apply other sensors in addition to the infrared reflective sensor, the ultrasonic sensor, and the thermal image sensor as long as it may detect a human body and output a signal corresponding to the distance.

The sensor 110 outputs a signal having a voltage size corresponding to the distance to the sensed user. Specifically, the infrared reflective sensor outputs a voltage size in inverse proportion to the distance, except for a very close state (for example, 5 to 6 cm) as shown in FIG. 5.

In the above description, the sensor 110 distinguishes between an operation of sensing a user and an operation of outputting a signal. In actual implementation, however, the sensor 110 may perform only an operation to output a signal corresponding to a user's distance without a separate sensing operation. That is, the processor 120 may determine whether the user is sensed based on the signal of the sensor 110. In addition, the two operations described above may be performed in one sensor or in different sensors.

In the above description, it is described that the sensor 110 outputs a voltage corresponding to the distance. However, in actual implementation, the sensor 110 may output a current value corresponding to the distance, output an impulse signal corresponding to the distance, or print information about the distance.

The display 130 displays various types of information provided by the image forming apparatus 100. Specifically, the display 130 may display a user interface window for receiving various functions provided by the image forming apparatus 100. The display 130 may be a monitor such as an LCD, a CRT, and an OLED, or may be implemented as a touch screen capable of simultaneously performing functions of an operation unit 140 to be described later.

The display 130 may display a control menu to perform a function of the image forming apparatus 100.

In addition, as for the display 130, a display state of a screen may be changed according to an operation state of the image forming apparatus. For example, when an operation state of the image forming apparatus 100 is a standby state, the display 130 may display a control menu. Here, the standby state is a state in which power is supplied to all the configurations in the image forming apparatus 100 and a job may be performed immediately when a users job execution command is inputted.

However, if the operation state of the image forming apparatus 100 is the power saving state, the display 130 may not display the control menu. Here, the power-saving state is a state in which power is not supplied to a part of the configuration in the image forming apparatus 100, and the image forming apparatus operates with power consumption which is lower than the power consumption of the standby state.

In the above description, it is described that the display 130 does not perform the display operation when the image forming apparatus 100 is in the power saving state. However, when the image forming apparatus 100 has a plurality of power saving states, display operation is performed in any of the power saving states, or the display operation may be stopped in any other power saving states. For example, the display operation may be stopped in the first power saving state to be described later, and the display operation may be performed in the second power saving or the second power saving state.

The processor 120 controls each configuration in the image forming apparatus 100. Specifically, the processor 120 may be implemented as a CPU, an ASIC, or the like. Further, the processor 120 may be composed of a plurality of CPUs. For example, the processor 120 may be composed of a main CPU which operates when the processor is in the standby state and a sub CPU which operates at a power consumption lower than the main CPU and performs simple control operations only.

The processor 120 determines the operation state (or operation mode) of the image forming apparatus 100 based on the signal output from the sensor 110.

Specifically, based on the output signal, the processor 120 may determine whether the user is approaching the image forming apparatus 100, passes by the image forming apparatus 100, or moves away from the image forming apparatus 100, and switch the operation state of the image forming apparatus.

More specifically, the processor 120 determines the amount of change in the voltage of the signal output from the sensor 110 (i.e., the slope of the signal), determines that the user approaches if the amount of change in voltage has a positive value for a predetermined time, determines that the user moves away if the voltage change amount has a negative value for a predetermined time, and determines that the user is passing the image forming apparatus if the voltage change amount has a positive value or negative value and for a time less than a predetermined time.

Here, the voltage change amount represents a change in the voltage of the signal per predetermined time unit, and may be a differential value (i.e., a slope of the signal) with respect to the output signal.

Meanwhile, in the above description, it is described that the approach and departure of the user are determined based on the change amount of the voltage change. However, in the implementation, the approach or departure of the user may be determined according to the stepwise change of the signal. For example, if the size of the signal is greater than or equal to the first size, it is determined that the user is approaching. If the size of the signal is greater than or equal to the second size which is greater than the first size, it may be determined that the user almost approaches the image forming apparatus. Conversely, if the size of the signal is greater than or equal to the second size and then changes to less than or equal to the first size, it may be determined that the user moves away from the image forming apparatus.

According to the determination result, when the operation state of the image forming apparatus 100 is in a power saving state and it is determined that the user approaches (that is, the calculated voltage change amount is a positive value during the predetermined time), the processor 120 may change the operating state of the image forming apparatus 100 to the standby state.

The processor 120, when it is determined that the operation state of the image forming apparatus is the standby state and the user moves away (that is, if the voltage change amount has a negative value for a predetermined time) may change an operation state of the image forming apparatus to a power saving state.

However, when the image forming apparatus 100 is performing a job requested by the user, the processor 120 does not immediately switch to the power saving state even if it is determined that the user is moving away, and change the operating state of the image forming apparatus 100 to the power saving state.

Although the image forming apparatus 100 has been described as having only one power saving state in the above description, the image forming apparatus 100 may have a plurality of power saving states at the time of implementation. In such a case, the processor 120 may change the operation state of the image forming apparatus 100 in a stepwise manner.

For example, the image forming apparatus 100 may be in the first power saving state in which power is not supplied to the image forming unit 150 and the display, the second power saving unit in which power is supplied to the display, but is not to the image forming unit 150, and the third power saving state in which power is supplied only to the fixing unit of the image forming unit 150.

In this case, when the image forming apparatus 100 is determined to be accessed by the user in the first power saving state, the processor 120 may change from the first power saving state to the second power saving state, and if it is determined that a user continues to approach even after being changed to the second power saving state, the processor 120 may change from the second power saving state to the standby state. Although the power saving state is divided into only two steps in the above description, the power saving state may be further subdivided into three or more stages at the time of implementation.

Although only a display and a fixer are described as an example of a configuration that operates in a power saving mode, the configuration may be an NFC communication unit (not shown) for receiving user authentication information or the above described infrared reflective sensor (when PIR sensor is provided together).

The processor 120 may determine the approach direction of the user according to the detection result, and store the result of the determination in the storage 160 in a cumulative manner. If the sensing direction of the sensor 110 is changeable, the processor 120 may adjust the detection direction of the sensor 110 based on the accumulated approach direction.

The processor 120 may then perform user authentication. Specifically, the processor 120 may perform user authentication based on user information input through the operation unit 140 or information received through the NFC. The processor 120 may receive the job execution command only for the authenticated user.

When the job execution command is input from the user or the print data is received from the external device, the processor 120 may perform processing on the received job execution command or the received print data. Specifically, the processor 120 may perform a job by controlling a function configuration corresponding to the users job execution command. For example, when the job execution command of the user is a copy job, the image forming unit 150 may be controlled to control the scan unit (not shown) to scan a transcript and to print the scanned transcript.

When the requested operation is completed and it is determined that the user has left the image forming apparatus 100, the processor 120 may determine the operation state of the image forming apparatus 100 as a standby state.

The processor 120 may control the power supply unit 170 to supply power corresponding to the power saving state. Here, the power saving state is an operating state having lower power consumption than the standby state, and may have a plurality of power saving states at the time of implementation.

As described above, the image forming apparatus 100 according to the embodiment automatically switches the operation state of the image forming apparatus 100 to the standby state according to the approach of the user, so that the waiting time of the user may be reduced. Further, when the user is detected to be distant from the image forming apparatus, the user may immediately switch to the power saving state without waiting for a predetermined time, and power consumption can be reduced.

Although only a simple configuration of the image forming apparatus has been shown and described above, various configurations may be additionally provided at the time of implementation. This will be described below with reference to FIG. 2.

FIG. 2 is a block diagram which illustrates a detailed configuration of an image forming apparatus according to an exemplary embodiment.

Referring to FIG. 2, the image forming apparatus 100 may include of a sensor 110, a processor 120, a display 130, an operation unit 140, an image forming unit 150, a storage 160, and a power supply unit 170.

The configurations of the sensor 110, processor 120, and the display 130 are the same as the configurations of FIG. 1, and will not be further described.

The operation unit 140 may receive a selection of a control command with respect to the corresponding function. Here, a function may include a printing function, a copying function, scanning function, and a fax transmission function. The operation unit 140 may receive a control command through a control command displayed on the display 130.

The operation unit 140 may be realized as a plurality of buttons, keyboards, and mouse, and a touch screen which may simultaneously perform a function of the aforementioned display 130.

The operation unit 140 may include a power button for changing the operation state of the image forming apparatus 100. The power button may be implemented as a physical switch or a soft switch. According to the operation of the power button, the image forming apparatus 100 may be switched from the standby state to the power saving state immediately, and also from the power saving state to the standby state.

The image forming unit 150 may print the print data. The image forming unit 150 may form an image on a recording medium by various printing methods such as an electrophotographic method, an inkjet method, a thermal transfer method, and a direct thermal method. For example, the image forming unit 150 may print an image on a recording medium by a series of processes including exposure, development, transfer, and fixing. The specific configuration of the image forming unit 150 will be described later with reference to FIG. 3.

The storage 160 stores various data necessary for the operation of the operating system and the operating system of the image forming apparatus 100. The storage 160 may store the print data received from an external device (not shown), store the scan data generated by the scan unit (not shown), and store the fax data received from the facsimile unit (not shown). In addition, history information on the above-described job may also be stored.

The storage 160 stores information on the user access direction. Here, the information on the users approach direction is accumulated information on the direction of the users movement when the user of the sensor 110 senses. This cumulative information may be reset as the image forming apparatus 100 moves. Specifically, when the position of the image forming apparatus 100 is changed, the approach of the user may also be changed.

The storage 160 may be implemented as a storage medium in the image forming apparatus 100 and an external storage medium such as a removable disk including a USB memory, a storage medium connected to a host, a web server through network or the like.

The power supply unit 170 selectively supplies power to each configuration inside the image forming apparatus 100 according to the operation state of the image forming apparatus 100.

FIGS. 1 and 2 illustrate only the general functions of the image forming apparatus 100. In addition to the above-described configuration, the image forming apparatus 100 may further include a communication unit for receiving a print job according to functions supported by the image forming apparatus 100, a scanning unit which performs a scan function, and a fax unit which performs a fax transmission/reception function, and the like.

For example, a communication unit (not shown) (or a transceiver) is connected to a terminal device (not shown) such as a mobile device (smart phone, tablet PC), a PC, a notebook PC, a PDA, a digital camera, and may receive files and print data from the terminal device (not shown).

The scan unit (not shown) scans a transcript to generate a scanned image. A fax unit (not shown) transmits the scanned image or received print data via a telephone network or an Internet network, or receives fax data through a telephone network or the Internet network.

FIG. 3 is a configuration map according to an exemplary embodiment of FIG. 2.

Referring to FIG. 3, the image forming unit 150 may include a photoreceptor 151, a charger 152, an exposing unit 153, a developing unit 154, a transfer unit 155, and a fixing unit 158.

The image forming unit 150 may further include a paper feeding unit (not shown) for feeding the recording medium P. An electrostatic latent image is formed on the photoconductor 151. The photoconductor 151 may be referred to as a photosensitive drum, a photosensitive belt or the like depending on its form.

The charger 152 charges the surface of the photoconductor 151 to a uniform electric potential. The charger 152 may be implemented in the form of a corona charger, a charging roller, a charging brush, or the like.

The exposing unit 153 changes the surface potential of the photoconductor 151 in accordance with the image information to be printed, thereby forming an electrostatic latent image on the surface of the photoconductor 151. As an example, the exposing unit 153 may form an electrostatic latent image by irradiating the photoconductor 151 with light modulated in accordance with image information to be printed. The exposing unit 153 of this type may be referred to as a light scanning device or the like, and an LED may be used as a light source.

The developing unit 154 accommodates the developer therein, and supplies the developer to the electrostatic latent image to develop the electrostatic latent image into a visible image. The developing unit 154 may include a developing roller 157 for supplying the developer to the electrostatic latent image. For example, the developer may be supplied from the developing roller 157 to the electrostatic latent image formed on the photoconductor 151 by the developing electric field formed between the developing roller 157 and the photoconductor 151.

A visible image formed on the photoconductor 151 is transferred to the recording medium P by the transfer device 155 or an intermediate transfer belt (not shown). The transfer unit 155 may transfer a visible image to the recording medium by, for example, an electrostatic transfer method. A visible image is attached to the recording medium P by electrostatic attraction.

The fixing unit 158 fixes a visible image on the recording medium P by applying heat and/or pressure to a visible image on the recording medium P. The printing operation is completed by this series of processes. This fixing unit 158 may be pre-heated to a predetermined temperature when the users access is detected.

The above-described developer is used every time the image forming operation proceeds, and becomes exhausted when it is used for a predetermined time or more. In this case, the unit for storing the developer (for example, the above-described developing unit 154) itself must be newly replaced. In this way, in the use of the image forming apparatus, the replaceable parts or components are referred to as consumable unit or replaceable units. To the consumable units, a memory (or CRUM chip) may be attached to the consumable unit for proper management of the consumable unit.

FIG. 4 is a drawing which illustrates an arrangement position of a sensor according to an exemplary embodiment.

Referring to FIG. 4, the sensor 110 is located on the front side of the image forming apparatus 100. Although in the illustrated example, it is illustrated that the sensor is disposed at the center of the image forming apparatus 100, but in implementation, it may be disposed on the operation panel on which the operation unit is located. This position may be changed depending on the size and shape of the image forming apparatus 100.

The sensing range in which the sensor 110 may sense the user is determined according to the arrangement position and the sensing direction of the sensor. Such a sensing range varies depending on the performance of the sensor (specifically, the sensing distance).

Meanwhile, when one sensor 110 is located, the sensing range may be fixed. However, if the sensing direction of the sensor is variable as shown in FIG. 7, the sensing range may be varied.

Further, although only one sensor 110 is shown as being disposed in the illustrated example, a plurality of sensors may be disposed at the time of implementation. Further, the plurality of sensors may be arranged at positions adjacent to each other or at a spaced apart position. Further, when a plurality of sensors are provided, they may be constituted only by the same kind of sensors or different kinds of sensors. These various examples will be described later with reference to FIGS. 8 to 11.

Since the image forming apparatus is used by many users, there are cases where image forming apparatuses are located in a place where many users may easily access. For example, when the image forming apparatus is disposed in the corridor through which the users move, unnecessary waste of power may occur if the operation state of the image forming apparatus is maintained in the standby state merely by detecting the person around the image forming apparatus.

Therefore, it is preferable to determine whether the user is approaching the image forming apparatus in consideration of the detected movement of the user, and to switch the operation state of the image forming apparatus to the standby state only when the user is approaching the image forming apparatus.

However, since the PIR sensor used as the human body detection sensor has a wide detection range, it may not accurately measure the direction of movement of the user. Thus, in this embodiment, an infrared reflective sensor which is a human body detection sensor that is capable of sensing distance is used.

Hereinbelow, the features of the infrared reflective sensor is described with reference to FIG. 5.

FIG. 5 is a drawing which illustrates the operational feature of the infrared reflective sensor.

Referring to FIG. 5, except for a case where the user is very adjacent (for example, 5 to 6 cm), the infrared reflective sensor outputs a voltage value that is inversely proportional to the distance at most distances.

Therefore, when the infrared reflective sensor is used, it is possible to determine the distance to the user based on the output voltage value of the sensor.

In this regard, the image forming apparatus 100 may be configured such that when the distance from the sensed user is continuously narrowed based on the amount of change in the voltage of the signal output from the infrared reflective sensor, the image forming apparatus may consider that a user is approaching to use the image forming apparatus 100 and switch the state to the standby state. This operation will be described later with reference to FIG. 16.

When the users access is determined by using only the voltage value itself (distance information) of the infrared reflective sensor, the image forming apparatus 100 may consider that a user approaches to use the image forming apparatus 100 for a user which is adjacent to the front surface of the image forming apparatus 100.

In this respect, in this embodiment, the movement of the user detected based on the amount of change in voltage with respect to the output signal of the infrared reflective sensor is analyzed.

Here, the voltage change amount is a change of the voltage value per unit time, and is a differential value (that is, a slope value) with respect to the output signal of the sensor. Accordingly, the differential value may be computed not only by software but also by using a hardware differentiator. That is, in the above description, it is described that the processor 120 calculates the amount of voltage change. However, the calculation operation of the processor 120 may be performed by a hardware differentiator, and the processor 120 may be implemented by using the output value of the hardware differentiator.

The amount of voltage change is a speed at which the user approaches the image forming apparatus. Therefore, if the calculated voltage change amount has a value exceeding 0 (i.e., a positive number), it may be understood that the user approaches the image forming apparatus.

Also, if the calculated voltage change amount has a value less than 0 (that is, negative number), it may be understood that the user moves away from the image forming apparatus.

Meanwhile, the characteristics of the voltage change amount depend on the characteristics of the infrared reflective sensor. If the sensor is opposite to that of the characteristics of the infrared ray sensor, the application described above may be opposite. For example, if the magnitude of the sign is proportional to the distance, if the voltage change amount is negative, the user is approaching, and if the voltage change amount is positive, the user moves away.

FIG. 6 is a diagram showing an example of an output waveform of an infrared reflective sensor according to a situation. Specifically, FIG. 6(*a*) is a view showing an output waveform of the infrared reflective sensor when the user approaches the image forming apparatus and then moves away from the image forming apparatus. FIG. 6(*b*) shows an output waveform of the infrared reflective sensor when a user passes by the front side of the image forming apparatus, and FIG. 6(*c*) is a diagram showing an output waveform of the infrared reflective sensor when a first user approaches the image forming apparatus and a second user passes the front side of the image forming apparatus.

Referring to FIG. 6(*a*), as the user approaches the image forming apparatus, the voltage value of the infrared reflective sensor gradually increases (first state). When the user operates the panel in front of the image forming apparatus, the voltage value maintains a constant value (second state), and when the user completes the operation and leaves the image forming apparatus, the voltage value gradually decreases (third state).

In the first state, as the voltage value increases, the voltage change amount with respect to the output value of the sensor has a positive value (that is, a positive number). Therefore, the image forming apparatus may determine that the user approaches if the voltage change amount has a positive value for a predetermined time.

In the second state, since there is no movement of the user, the voltage change amount has a value of zero. Thus, the image forming apparatus may determine that the user is located in front of the image forming apparatus.

In the third state, as the voltage value decreases, the voltage change amount with respect to the output value of the sensor has a negative value (that is, a negative number). Therefore, if the voltage change amount has a negative value for a predetermined time, the image forming apparatus may determine that the user moves away.

Referring to FIG. 6(b), as the user passes the front of the image forming apparatus, an instantaneously high voltage value is maintained for a certain period of time.

In this case, a very high amount of voltage change is obtained at the time when the first user is detected. However, since the voltage change amount value is maintained for a very short time, the image forming apparatus does not hold a positive value of the voltage change amount for a predetermined time, and does not determine that the user is approaching the image forming apparatus. Here, the predetermined time may be about 400 ms.

If the users access is determined based on only the signal size, in the case of FIG. 6B, a voltage exceeding a certain level will be maintained for a predetermined time (ex, 500 ms), and it is considered that the user's is approaching.

However, in this embodiment, as described above, the user access is determined based on whether the voltage change amount is maintained for a predetermined period of time, and when the user passes the image forming apparatus, the mode is not switched to the standby mode.

Referring to FIG. 6(c), when the second user passes in front of the image forming apparatus while the first user approaches the image forming apparatus, the voltage value continuously increases, and when the second user passes, the voltage value comes to have a higher value temporarily.

However, even if there is a section in which there is no voltage value change within a section that continuously changes, there exists a section in which the voltage change amount maintains a positive value for a certain period of time before and after the corresponding section and based on this, the image forming apparatus 100 may confirm that the user is approaching the image forming apparatus 100.

FIG. 7 illustrates a configuration of a sensor of which a sensing direction can be changed.

Referring to FIGS. 7(a) and 7(b), in order to direct a users approach direction in a direction in which a users approach direction is anticipated by using accumulated data of a users approach direction, the left and right directions of the sensor may be changed using a driver 180.

The driver 180 may be composed of a motor 181 and a driving gear 182.

The motor 181 rotates the driving gear under the control of the processor 120. This motor 181 may use a step motor for precise rotation control. The step motor is a motor that rotates by a predetermined angle corresponding to an input pulse signal.

However, when the direction of the sensor is changed in accordance with each change of the step motor, precise direction switching is difficult. Accordingly, the sensing direction of the sensor may be precisely changed using the driving gear 182.

Here, the driving gear 182 may be composed of a combination of a pinion worm gear and a helical gear that changes the sensing direction of the sensor at a predetermined gear ratio corresponding to the rotation of the motor 181. The rotation angle of the sensor may be further subdivided by the ratio of the angle of the worm gear to the number of teeth of the helical gear for an accurate rotation ratio.

That is, the pinion connected to the motor using the step motor may include a worm gear, the driving gear may include a helical gear, and the driving gear may be constructed in a structure that a sensor is attached to the driving gear to minimize shaking of a sensor. On the other hand, in an office environment, whether a user uses an image forming apparatus may be detected sufficiently if rapid steps of a normal person can be recognized.

FIGS. 8 to 11 illustrate various examples of using a plurality of sensors.

For example, FIG. 8 is a view illustrating an example which uses an infrared reflective sensor and a passive infrared ray (PIR) sensor.

Referring to FIG. 8, when the infrared reflective sensor 111 and the PIR sensor 112 are positioned in the same position, the PIR sensor 112 may detect a wider range than the infrared reflective sensor 111.

In the meantime, the PIR sensor 112 has a drawback in that the sensor can only find out whether the human body is present in a predetermined scope, but it is difficult to find out the distance from the human body.

Accordingly, it is determined whether the user is located within a predetermined range by using the PIR sensor 112, and whether the user accesses the infrared image using the infrared reflective sensor 111 secondarily. The operation of animage forming apparatus when such an infrared reflective sensor and a PIR sensor are used will be described later with reference to FIGS. 17 and 18.

FIG. 9 illustrates an example using an infrared reflective sensor and PIR sensor which can change a sensing direction.

Referring to FIGS. 8 and 9, except that the infrared reflective sensor may change a detection direction, the operation of FIG. 9 is the same as the operation of FIG. 8.

In the meantime, if not only a back side but a lateral side of the image forming apparatus 100 is adjacent to the wall, generally a user approaches in an diagonal direction rather than approaches to a front direction of the image forming apparatus.

Accordingly, when the infrared reflective sensor can change the sensing direction, the sensing accuracy can be improved by having the sensing direction in a direction in which the user generally approaches. The adjustment of the sensing direction may be directly adjusted by the processor through the data learning process or may be set by the operation of a user.

FIG. 10 illustrates an example of one PIR sensor and two infrared reflective sensors.

Referring to FIG. 10, the two infrared reflective sensors are spaced apart from each other and have sensing directions in directions intersecting with each other. Specifically, a first infrared reflective sensor 111-1 is disposed in the first direction, and a second infrared reflective sensor 111-2 is disposed at a position spaced apart from the first infrared reflective sensor 111-2 in a second direction that intersects the first direction.

The configurations and operations of the PIR sensor are the same as FIG. 8 and thus will not be described further.

FIG. 11 illustrates one PIR sensor and three infrared reflective sensors 111-1, 111-2, 111-3.

Referring to FIG. 11, three infrared reflective sensors are disposed apart from each other and have sensing directions which intersect with each other.

The configurations and operations of the PIR sensor are the same as FIG. 8 and thus will not be described further.

Hereinbelow, with reference to FIG. 12, an output waveform of each infrared reflective sensor by moving directions of a user will be described.

FIG. 12 illustrates an example of a signal waveform according to an example of FIG. 11.

Referring to FIG. 12(a), when a user moves in direction ⓐ, all the three sensors detect a user in a front direction of the image forming apparatus and it is confirmed that an output signal changes in the same timing.

Referring to FIG. 12(*b*), when a user moves in a direction ⓑ, the third sensor (3) detects a user first, and then the first sensor (1) and the second sensor (2) detect a user and an output signal changes accordingly.

Referring to FIG. 12(*c*), when a user moves in a direction ⓒ, the second sensor (2) detects a user first, and then the first sensor (1) and the third sensor (3) detect a user and an output signal changes accordingly.

Referring to FIG. 12(*d*), when a user moves in a direction ⓓ, the third sensor, the second sensor, and the first sensor detect a user in order, and an output signal changes accordingly.

As described above, by using a plurality of infrared reflective sensors, a user's approach direction can be found. In addition, a moving direction of a user can be more accurately found.

FIGS. 13 and 14 illustrate an example of using a thermal sensor.

The exemplary embodiments of FIG. 13 and FIG. 14 are exemplary embodiments to detect a position of a user using a thermal imaging sensor 113 and the PIR sensor.

Referring to FIG. 13 and FIG. 14, the PIR sensor 112 may detect a user in a rather wider range.

In the meantime, the PIR sensor 112 may detect whether the human body exists in a predetermined range, but it may be difficult to find the distance to/from the human body.

Accordingly, it is possible to detect the user through the PIR sensor 112 and to distinguish the movement mode of the user detected by using the thermal sensor 113 secondarily. For example, it is possible to determine whether a user is approaching the image forming apparatus or passing by the image forming apparatus according to the change in the number of cells 1310, 1320 detected by the thermal image sensor or the shape of the cell. A specific operation method in the case of using the thermal image sensor will be described later with reference to FIG. 19.

FIG. 15 is a flowchart for explaining an operation method according to the first exemplary embodiment of the disclosure. Specifically, in the operation method according to the first embodiment, one infrared reflective sensor is used, and an operation state is controlled according to a voltage change amount of a signal of the infrared reflective sensor.

Referring to FIG. 15, the image forming apparatus determines whether a user (or a human body) is detected using the sensor 110 1505.

As a result of the determination, if a user is not detected 1505-N, the time which is not successively detected is counted, and if the time which is not successively detected is greater than the predetermined second time 1510-Y, the state may be changed to a power saving state 1515.

If it is shorter than the preset second time 1510-N, the above-described user detection determination operation can be repeatedly performed. Such an operation is a case where the operation state of the image forming apparatus is the standby state, and if the user is not detected in the power saving state, the separate counting operation may not be performed. In the embodiment, the counting operation is performed when the user is not detected. However, in implementation, the counting operation may be omitted in order to rapidly switch the operation state.

If a user is sensed 1505-Y, it may be determined whether voltage change amount (dV/dt) of an output signal is greater than 0 (that is, it is a positive number) 1520.

As a result of determination, if voltage change amount is a negative number 1520-N, it is determined that a user is sensed and then disappears and a state is returned to the previous user detection state 1505.

In contrast, if the voltage change amount is positive 1520-Y, it is determined that the user is approaching the image forming apparatus and the time is counted. The count value is compared with a predetermined first time T1 1525. Here, the first time is a time for distinguishing from a user who passes the front of the sensor, and may be about 400 ms.

As a result of comparison, if a count value is less than a predetermined time (T1) 1525-N, whether the voltage change amount of a sensor is greater than 0 can be repeatedly compared.

On the contrary, if the count value is larger than the preset time (T1) 1525-Y, it is determined that the user is approaching the direction of the apparatus and can perform the wakeup operation 1535. By confirming again if the voltage change amount of the signal is greater than zero before the wake-up operation, the operation of additionally verifying may be performed 1530. In implementation, the order of verifying operation 1530, wake-up operation 1535 may be reversed.

Thereafter, by inputting a job execution command through the operation unit 150 or performing an operation to insert an USB or loading a transcript on a scanning unit, a user determines whether interrupt occurs from an internal configuration within the image forming apparatus 1540.

As a result of determination, if interrupt occurs 1540-Y, an operation corresponding to the occurred interrupt can be executed 1555.

If interrupt does not occur 1540-N, whether a user is detected may be determined 1545, and when a user is detected 1545-Y, a wake-up state can be maintained.

If, the interrupt does not occur 1540-N, and a user is not detected 1545-N, after confirming that a job is processed 1550, and then a state can be converted to a previous sensed operation state 1505.

FIG. 16 is a flowchart for explaining an operation method according to the second embodiment of the disclosure. Specifically, the operation method according to the second embodiment uses one infrared reflection type sensor, and controls the operation state according to the signal intensity of the infrared reflection type sensor.

Referring to FIG. 16, the image forming apparatus determines whether a user (or a human body) is detected using the sensor 110 1605.

As a result of determination, if a user is not sensed 1605-N, time of a user not being sensed is counted, and if the time is greater than the predetermined second time 1610-Y, a state can be converted to a power-saving state 1615.

If it is shorter than the preset second time 1610-N, the above-described user detection determination operation can be repeatedly performed. Such an operation is a case where the operation state of the image forming apparatus is the standby state, and if the user is not detected in the power saving state, the separate counting operation may not be performed.

If a user is sensed 1605-Y, whether a signal of the sensor is greater than or equal to the predetermined first voltage value may be determined 1620.

As a result of determination, if a size of the signal is less than the predetermined first voltage value 1620-N, a state can be converted to a previous user sensed state.

If the size of the signal is larger than the preset first voltage value 1620-Y, the first driving unit is driven and it is determined whether the size of the signal is greater than a preset second voltage value 1630. Here, the second voltage value is larger than the first voltage value. The first operation unit may be a display, an NFC communicator, or the like.

If the size of the signal is greater than the predetermined second voltage value, the second driving unit is driven and it is determined whether the period in which the size of the signal is larger than the predetermined second voltage value is longer than a predetermined first time S1640. Here, the second driving unit may be the fixer or the entire image forming unit.

If the maintenance of the second voltage value is longer than the preset first time 1640-Y, it is determined that the user approaches the device and wake-up is performed 1645. Here, the first time may be about 400 ms, which is a time for determining a user who passes nearby the image forming apparatus.

After that, the user inputs a job execution command through the operator 150, or inserts a USB or loads a transcript into a scanner, and determines whether an interrupt has occurred from the internal configuration of the image forming apparatus 1650.

As a result of determination, if interrupt occurs 1650-Y, an operation corresponding to the occurred interrupt can be executed 1665.

If interrupt does not occur 1650-N, whether a user is sensed may be determined 1655, and if a user is sensed 1655-Y, a wakeup state may be maintained.

If an interruption does not occur 1650-N, and if the user is not detected 1655-N, it is checked whether the operation is proceeding 1660, and the state may be switched to the previous sensing operation state 1605.

FIG. 17 is a flowchart to describe an operation method according to a third exemplary embodiment. More specifically, the operation method according to the third exemplary embodiment is an embodiment in which a pyroelectric sensor is used for user detection and an infrared reflective sensor is secondarily used when a user is sensed.

Referring to FIG. 17, whether a user is positioned within a predetermined scope is checked using the PIR sensor 1705.

If it is determined that the user is not sensed 1705-N, the time not continuously sensed is counted. If the time that is not continuously sensed is greater than the predetermined first time 1710-Y, a state may be changed to a power-saving state 1715.

If it is shorter than the predetermined first time 1710-N, the above-described user sensing determination operation may be repeatedly performed. Such an operation is a case where the operation state of the image forming apparatus is the standby state, and if the user is not sensed in the power saving state, the separate counting operation may not be performed.

If a user is sensed 1705-Y, the infrared reflective sensor is turned on 1720, and it is confirmed whether a user is sensed from the infrared reflective sensor 1725.

As a result of confirmation, if the user is not sensed by the infrared reflective sensor 1725-N, the time which is not consecutively sensed is counted, and if the consecutively unsensed time is greater than the predetermined second time 1730-Y, the state may be changed to the power saving state 1715. Here, the predetermined second time may be the same as the first time described above, and may be shorter than the first time.

If the time that is not continuously detected is shorter than the predetermined second time 1730-N, the above-described user detection determination operation may be repeatedly performed 1705.

If a user is detected in the infrared reflective sensor 1725-Y, it is determined whether the users detection time in the infrared reflective sensor is greater than a preset third time 1735. Here, the predetermined third time may be about 400 ms, which is a time for determining whether or a user passes adjacent to the image forming apparatus.

If the user detection time is longer than the predetermined third time 1735-Y, it is determined that the user approaches the device and wake-up is performed 1740. When wake up is performed, the operation of the PIR sensor may be turned off.

After that, the user inputs a job execution command via the operation unit 150, or performs an operation of inserting USB or loading a document on the scanning unit to determine whether an interrupt has occurred from the internal configuration of the image forming apparatus 1745.

As a result of determination, if interrupt occurs 1745-Y, an operation corresponding to the occurred interrupt can be performed 1760.

If an interrupt does not occur 1745-N, it is determined 1750 whether the user is detected at the infrared reflective sensor 1750-Y and if the user is detected 1750-Y, wake-up state can be maintained 1760.

If no interrupt occurs 1745-N, and if no user is detected 1750-N it is checked whether the operation is in progress 1755, and if the operation does not proceed 1755-Y, the state may be switched to the previous sensing operation state 1725.

FIG. 18 is a flowchart to describe an operation method according to a fourth exemplary embodiment. Specifically, the operation method according to the fourth embodiment is an embodiment in which a PIR sensor is used for sensing a user and a voltage change amount of a signal of an infrared reflective sensor is used secondarily when a user is sensed.

Referring to FIG. 18, it is checked first whether a user is located within a predetermined scope using the PIR sensor 1805.

If the user is not sensed as a result of the determination 1805-N, the non-consecutively detected time is counted. If the consecutively undetected time is greater than the predetermined first time 1810-Y, the state may be changed to a power-saving state 1815. If it is shorter than the preset first time 1810-N, the above-described user detection determination operation may be repeatedly performed. Such an operation is a case where the operation state of the image forming apparatus is the standby state, and if the user is not sensed in the power saving state, the separate counting operation may not be performed.

If a user is sensed 1805-Y, the infrared reflective sensor is turned on 1820, and it is checked whether a user is sensed in the infrared reflective sensor 1825.

As a result of determination, if a user is not sensed 1825-N in the infrared reflective sensor, the time which is not continuously sensed is counted. If the time that is not sensed continuously is greater than the preset second time 1830-Y, the state may be changed to the power saving state 1815.

If a user is sensed by an infrared reflective sensor 1825-Y, the voltage variation (dV/dt) (or slope) of the output signal of the infrared reflective sensor is greater than zero (that is, a positive number) may be determined 1835.

As a result of the determination, if the voltage change amount is negative (1835-N), it is determined that the user is sensed and then disappeared, and the state returns to the previous user sensing state 1825.

In contrast, if the amount of voltage change is positive 1835-Y, it is determined that the user is approaching the image forming apparatus and the time is counted. Then, the count value is compared with a predetermined third time T1 1840. If the count value is smaller than the predetermined time T3, it is repeatedly compared whether the voltage change amount of the signal of the sensor is greater than 0.

If the count value is larger than the preset time T1, it is determined that the user approaches the device and wakes up is performed 1850. On the other hand, when the voltage change amount of the signal is greater than zero is repeatedly checked before the wake-up operation, it may be further verified whether the users approach is correct 1845.

After that, it is determined whether an interrupt is generated by the operation unit 150 or by copying, scanning, faxing, USB printing or the like 1855. If an interruption occurs 1855-Y, the corresponding operation may be performed 1870.

If the interrupt does not occur 1855-N, it may be determined whether a user is sensed 1860, and a wake-up state may be maintained.

If an interrupt is not generated 1855-N, and if the user is not sensed 1860-N, it is determined 1865 that the operation is proceeding, and the state may be switched to the previous sensing operation state.

FIG. 19 is a flowchart to describe an operation method according to a fifth exemplary embodiment. More specifically, the operation method according to the fifth embodiment is an embodiment in which the PIR sensor is used for user sensing and a thermal image sensor is used secondarily when a user is sensed.

Referring to FIG. 19, it is checked whether a user is positioned within a predetermined scope using the PIR sensor 1905.

If it is determined that the user is not detected 1905-N, the non-consecutively detected time is counted. If the consecutively not detected time is greater than the preset first time 1910-Y, the state may be changed to the power-saving state 1915. If it is shorter than the preset first time 1910-N, the above-described user detection determination operation may be repeatedly performed. Such an operation is a case where the operation state of the image forming apparatus is the standby state, and if the user is not detected in the power saving state, the separate counting operation may not be performed.

If a user is detected 1905-Y, the thermal sensor is turned on 1920 and it is checked whether a user is detected in the thermal sensor 1925. Specifically, for each of the thermal sensors, it is possible to confirm whether a user is detected through a contour which appears when connecting sensors of which temperature value is greatly different from ambient sensors or of which temperature is significantly different from other sensors.

If the user is not detected from the thermal sensor 1925-N, the number of consecutive undetected time is counted. If the consecutively undetected time is greater than the preset second time 1930-Y, the state may be changed to the power-saving state 1915. If the time is shorter than the preset second time 1930-N, the above-described user detection determination operation may be repeatedly performed.

If a user is sensed at the thermal sensor 1925-Y, it is determined whether the user is sensed for a predetermined third time 1735.

If the detection period is longer than the preset third time 1935-Y, it is determined that the user approaches the device and wake-up is performed 1940. When wake up is performed, the operation of the PIR sensor may be turned off.

Thereafter, it is determined whether an interrupt is generated by the operation unit 150 or by copying, scanning, faxing, USB printing or the like 1945. If an interrupt occurs 1945-Y, the corresponding operation may be performed 1960.

If no interrupt occurs 1945-N, it is determined whether the user is detected 1950, and if the user is detected 1950-Y, the wakeup state may be maintained.

If no interruption occurs 1945-N, and if the user is not detected 1950-N, it is determined whether the operation is proceeding 1955, and then the state is switched to the detection operation state using the preceding infrared reflective sensor 1925. In implementation, a state may be switched to an operating state using the PIR sensor.

FIG. 20 is a flowchart to describe a controlling method of an image forming apparatus according to an exemplary embodiment.

First, a user within a preset range is sensed and a signal having a size corresponding to the distance from the sensed user is output 2010. Specifically, it is possible to detect whether a user within a predetermined range is located using the second sensor, and output a signal having a size corresponding to a distance from the detected user using the first sensor when the user is sensed. Meanwhile, one sensor may be used for sensing and signal output at the time of implementation.

Then, a voltage change amount with respect to the signal is calculated 2020. Specifically, the voltage change amount may be calculated by calculating the voltage size change of the signal per predetermined time unit of the signal.

The operation state of the image forming apparatus is switched based on the calculated voltage change amount 2030. Specifically, if the calculated voltage change amount has a positive value or a negative value for a predetermined time, the operation state of the image forming apparatus may be switched. For example, if the operation state of the image forming apparatus is the power saving state and the calculated voltage change amount has a positive value for a predetermined time, the operation state of the image forming apparatus may be switched to the standby state. On the other hand, when the image forming apparatus has a plurality of power saving states, the operating states of the image forming apparatus may be switched stepwise from the plurality of power saving states to the standby state based on the amount of voltage change. Alternatively, the operating state of the image forming apparatus may be switched so as to have an operating state corresponding to the size of the signal among the plurality of power saving states and the standby state.

If the operation state of the image forming apparatus is in the standby state and the calculated voltage change amount has a negative value for a predetermined time, the operation state of the image forming apparatus may be switched to the power saving state. However, if the image forming apparatus is in a job execution state for performing a job requested by the user and the calculated voltage change amount has a negative value for a predetermined time, the operation state of the image forming apparatus may be switched to the power saving state.

Therefore, the controlling method according to the embodiment automatically switches the operation state of the image forming apparatus 100 to the standby state according to the users approach, thereby reducing the waiting time of the user. Further, when it is sensed that the user moves away from the image forming apparatus, the state may be immediately switched to the power saving state without waiting for a preset time, thereby reducing power consumption. The control method as shown in FIG. 20 may be executed on an image forming apparatus having the configuration of FIG. 1 or FIG. 2, or on an image forming apparatus having other configurations.

In addition, the controlling method as described above may be implemented as at least one executable program for executing the control method as described above, and the executable program may be stored in a non-transitory readable medium.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing exemplary embodiments and advantages are merely exemplary and are not to be construed as limiting the inventive concept. The exemplary embodiments may be readily applied to other types of device or apparatus. Also, the description of the exemplary embodiments is intended to be illustrative, and not to limit the scope of the inventive concept, and many alternatives, modifications, and variations will be apparent to those skilled in the art.

Although embodiments have been shown and described, it would be appreciated by those skilled in the art that changes may be made to these embodiments without departing from the principles and spirit of the disclosure, the scope of which is defined in the claims and their equivalents.

The invention claimed is:

1. An image forming apparatus, comprising:
a display;
a sensor to sense a body of a user to output a signal; and
a processor to,
change an operation state of the image forming apparatus based on an amount of change indicated in the signal maintained for a time period.

2. The image forming apparatus as claimed in claim 1, wherein the change in the signal is in form of at least one type change selected from among types of changes, including a change to a positive voltage value for the time period, a change to a negative voltage value for the time period, a change in a size of a voltage value of the signal relative to a reference voltage value for the time period, and a change in a number of cells of a matrix representing contour of the body of the user.

3. The image forming apparatus as claimed in claim 2, wherein the amount of change in the signal corresponds to a plurality of amounts of change in the signal per plural units of time respectively maintained for the time period.

4. The image forming apparatus as claimed in claim 1, wherein the processor is to:
in response to the operation state of the image forming apparatus being a power-saving state and the amount of change in the signal having first value for the time period, change the operation state of the image forming apparatus to a standby state, and
in response to the operation state of the image forming apparatus being the standby state and the amount of change in signal having a second value for the time period, change the operation state of the image forming apparatus to the power-saving state.

5. The image forming apparatus as claimed in claim 1, wherein the processor is to, in response to the image forming apparatus being in a job performing state to perform a job, and the amount of change in the signal having a value for the time period indicative of the user moving away from image forming apparatus, change the operation state of the image forming apparatus to a power-saving state when the job is terminated.

6. The image forming apparatus as claimed in claim 1, wherein the image forming apparatus is to have a plurality of power-saving states, and the processor is to change the operation state of the image forming apparatus from a power-saving state, among the plurality of power-saving states, to a standby state, in a stepwise manner based on the amount of change in the signal per unit time.

7. The image forming apparatus as claimed in claim 6, wherein the signal indicates a voltage value and the processor is to change the operation state of the image forming apparatus to one of the standby state or one of the plurality of power-saving states that corresponds to the amount of change in the voltage value indicated by the signal for the time period.

8. The image forming apparatus as claimed in claim 6, further comprising an image forming unit to perform an image forming operation and having a fixer to fix a visible image on a recording medium,
wherein the plurality of power-saving states include:
a first power-saving state in which power is not supplied to the image forming unit and the display;
a second power-saving state in which power is supplied to the display and power is not supplied to the image forming unit; and
a third power-saving state in which power is supplied to the display and power is supplied only to the fixer.

9. The image forming apparatus as claimed in claim 1, wherein the sensor is at least one sensor among an infrared reflective sensor, an ultrasonic sensor, and a thermal sensor.

10. The image forming apparatus as claimed in claim 1, further comprising:
a driver to change a sensing direction of the sensor,
wherein the processor is to control the driver to adjust the sensing direction of the sensor based on a data learning process from approach direction information of the user.

11. The image forming apparatus as claimed in claim 1, wherein,
the sensor is a plurality of sensors including a first sensor and a second sensor,
the second sensor is at least one sensor from among the plurality of sensors including a sensor that requires less power to operate than the first sensor, a sensor that outputs a signal from a wider area range than the first sensor, and a passive infrared ray (PIR) sensor; and
the processor is to,
turn off the first sensor when the image forming apparatus is in a power-saving state as the operation state, and
turn on the first sensor to sense the body of the user, in response to the body of the user being sensed using the second sensor.

12. A non-transitory readable medium storing a program, which when executed by a processor of an image forming apparatus, cause the processor to execute a process comprising:
obtaining a signal of a sensor used to sense a body of a user; and
in response to an amount of change indicated in the signal maintained for a time period, changing an operation state of the image forming apparatus.

13. The non-transitory readable medium of claim 12, wherein the change in the signal is in form of at least one type of change selected from among types of changes, including a change to a positive voltage value for the time period, a change to a negative voltage value for the time period, and a change in a size of a voltage value of the signal relative to a reference voltage value for the time period, and a change in a number of cells of a matrix representing contour of the body of the user.

14. The non-transitory readable medium of claim 12, wherein the changing comprises:
   in response to the operation state of the image forming apparatus being a power-saving state and the amount of change in the signal having a first value for the time period, changing the operation state of the image forming apparatus to a standby state, and
   in response to the operation state of the image forming apparatus being the standby state and the amount of change in the signal having a second value for the time period, changing the operation state of the image forming apparatus to the power-saving state.

15. The non-transitory readable medium of claim 12, wherein the changing comprises, in response to the image forming apparatus being in a job performing state to perform a job, and the amount of change in the signal having a value for the time period indicative of the user moving away from the image forming apparatus, changing the operation state of the image forming apparatus to a power-saving state when the job is terminated.

16. The non-transitory readable medium of claim 12, wherein the image forming apparatus has a plurality of power-saving states and the changing comprises changing the operation state of the image forming apparatus from a power-saving state, among the plurality of power-saving states, to a standby state, in a stepwise manner based on the amount of change in the signal per unit time.

17. The non-transitory readable medium of claim 16, wherein the signal indicates a voltage value and changing comprises changing the operation state of the image forming apparatus to one of the standby state or one of the plurality of power-saving states that corresponds to the amount of change in the voltage value indicated by the signal for the time period.

18. The non-transitory readable medium of claim 16, wherein the plurality of power-saving states comprise:
   a first power-saving state in which power is not supplied to an image forming unit of the image forming apparatus and in which power is not supplied to a display of the image forming apparatus;
   a second power-saving state in which power is supplied to the display and power is not supplied to the image forming unit; and
   a third power-saving state in which power is supplied to the display and power is supplied only to a fixer of the image forming unit.

19. The non-transitory readable medium of claim 12, further comprising:
   adjusting a sensing direction of the sensor based on a data learning process from approach direction information of the user.

20. The non-transitory readable medium of claim 12, wherein,
   the sensor is a plurality of sensors including a first sensor and a second sensor,
   the second sensor is at least one sensor from among the plurality of sensors which requires less power to operate than the first sensor a sensor that outputs a signal from a wider area range than the first sensor, and a passive infrared ray (PIR) sensor; and
   the process further includes:
      turning off the first sensor when the image forming apparatus is in a power-saving state as the operation state, and
      turning on the first sensor to sense the body of the user, in response to the body of the user being sensed using the second sensor.

* * * * *